(12) United States Patent
Merrell

(10) Patent No.: US 9,729,700 B2
(45) Date of Patent: Aug. 8, 2017

(54) ANSWERING CALL BASED UPON THERMAL DETECTION OF PROXIMITY TO A USER

(71) Applicant: Motorola Mobility LLC, Chicago, IL (US)

(72) Inventor: Thomas Merrell, Beach Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/973,901

(22) Filed: Dec. 18, 2015

(65) Prior Publication Data

US 2017/0180544 A1 Jun. 22, 2017

(51) Int. Cl.
*H04M 1/725* (2006.01)
*H04M 1/64* (2006.01)
*H04W 4/02* (2009.01)

(52) U.S. Cl.
CPC ........ *H04M 1/72569* (2013.01); *H04M 1/64* (2013.01); *H04W 4/023* (2013.01); *H04W 4/026* (2013.01); *H04M 2250/12* (2013.01)

(58) Field of Classification Search
CPC .......... H04M 1/72569; H04M 1/0241; H04M 2250/12
See application file for complete search history.

(56) References Cited

U.S. PATENT DOCUMENTS

2010/0105423 A1* 4/2010 Gupta ................ H04M 1/7253
455/550.1
2014/0349629 A1* 11/2014 Chan ...................... H04W 8/22
455/418

* cited by examiner

*Primary Examiner* — Nam Huynh
(74) *Attorney, Agent, or Firm* — Amerson Law Firm, PLLC

(57) ABSTRACT

A method includes generating a call alert notification on a device responsive to receiving an incoming call. A removal of the device from a stowed position is detected after generating the call alert notification. The incoming call is answered responsive to thermally detecting a proximity between the device and the user within a predetermined time period after detecting the removal of the device from the stowed position.

20 Claims, 3 Drawing Sheets

ANSWERING CALL BASED UPON THERMAL DETECTION OF PROXIMITY TO A USER

BACKGROUND

Field of the Disclosure

The disclosed subject matter relates generally to mobile telephony and, more particularly, to answering a call based upon thermally detecting the proximity to a user.

Description of the Related Art

Mobile telephone devices generally require a user to physically interact with the device to perform various functions, such as answering calls. Many mobile telephones employ touch screen interfaces. In some cases, it is difficult for a user to interface with the touch screen to interact with the phone. For example, during periods of cold weather, the user may be wearing gloves. Although some gloves have materials provided on one or more fingertips to allow the user to interact with a touch screen, many do not. In other cases, the user may be engaged with other activities when a call is received, so both hands may not be available. Many user interfaces require a user to use a finger gesture, such as swipe to answer the call. Such actions are difficult with one hand, and may compromise the user's grip on the phone and increasing the likelihood that it may be dropped.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
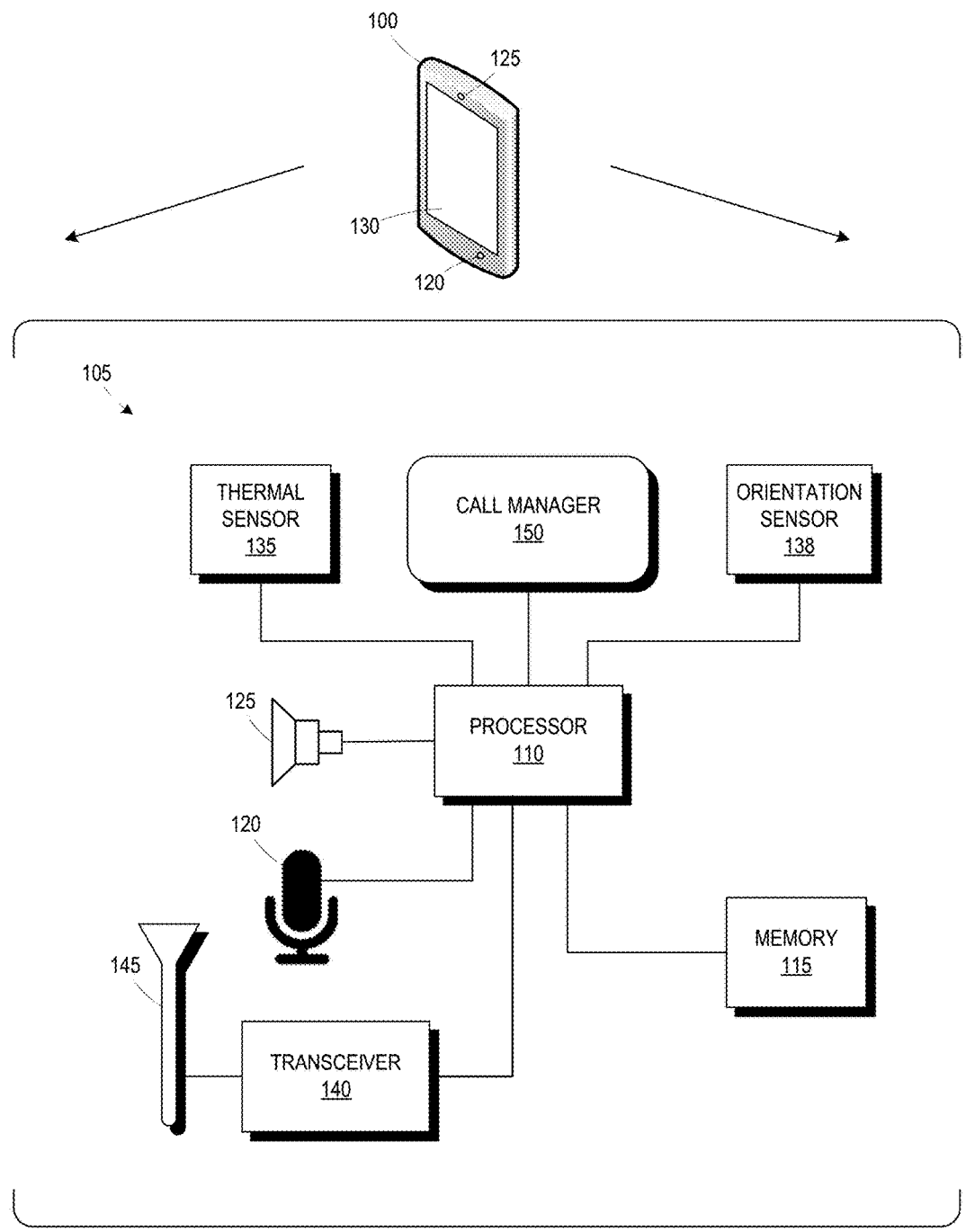
FIG. 1 is a simplified block diagram of a device configured to answer an incoming call based on thermally detecting proximity to a user, according to some embodiments.
Figure 2:
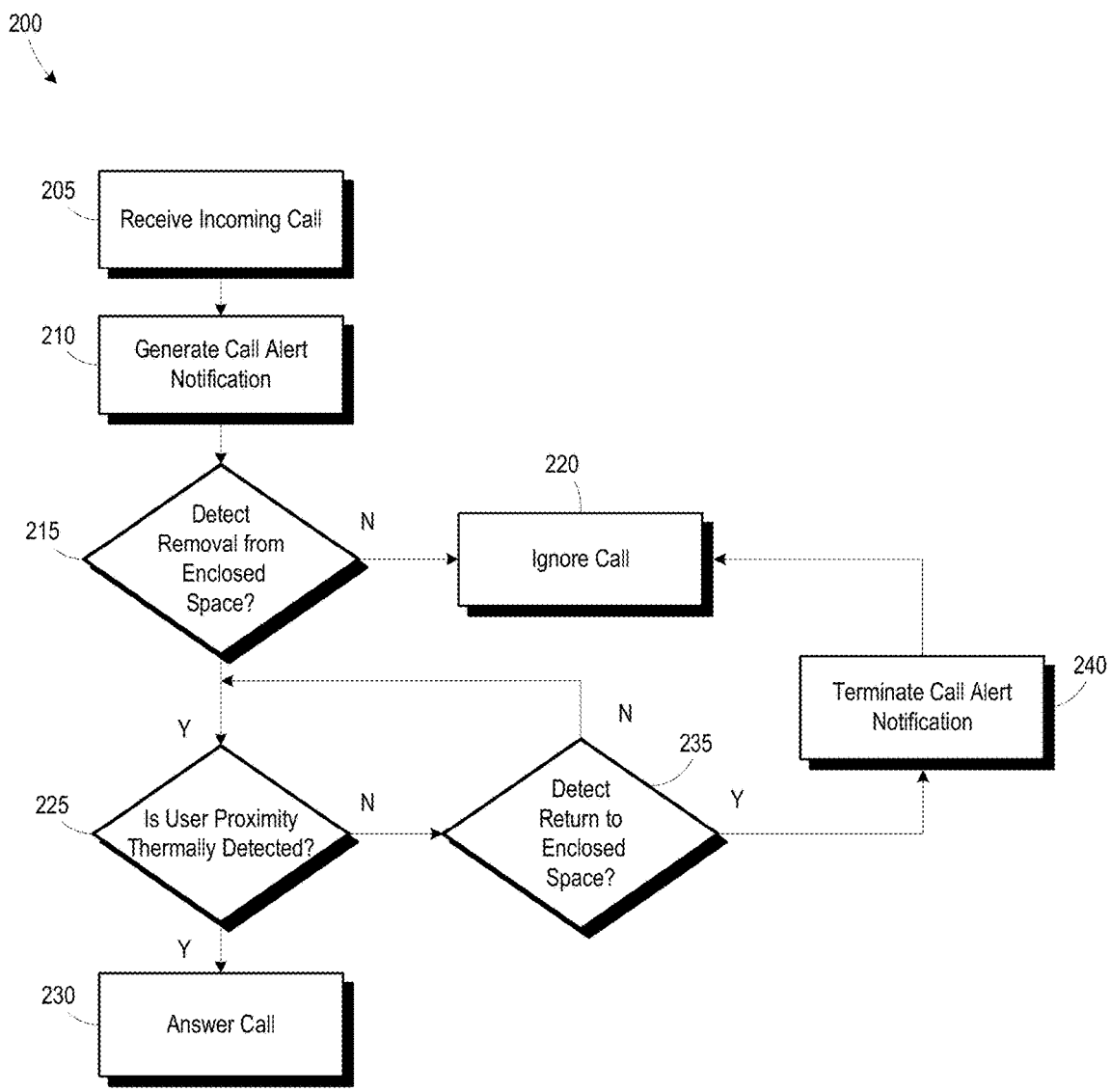
FIG. 2 is a flow diagram of a method for answering an incoming call based on thermally detecting proximity to a user, according to some embodiments.
Figure 3:
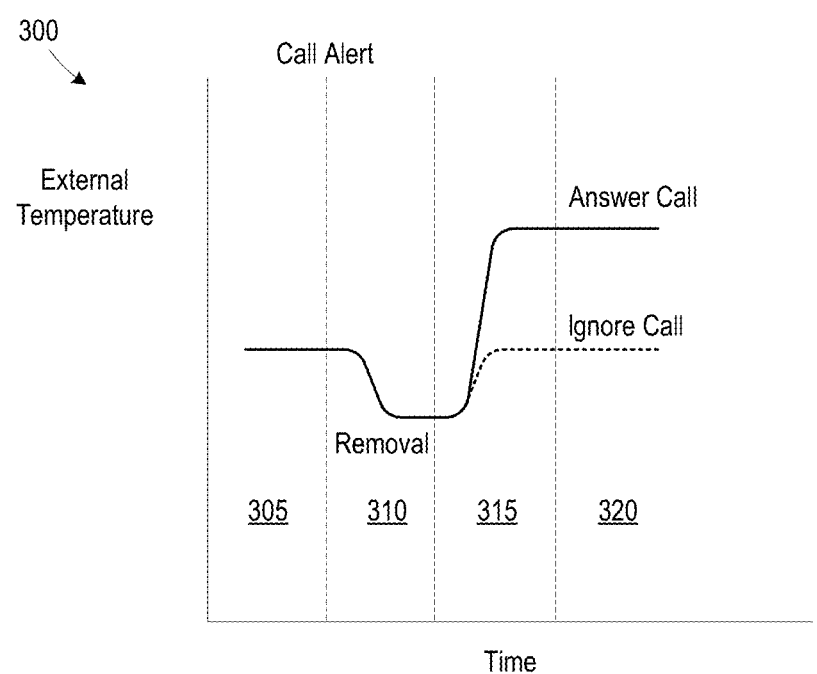
FIG. 3 is a diagram illustrating a temperature profile associated with a user's interaction with the device to address an incoming call, according to some embodiments.

FIGS. 1-3 illustrate example techniques for answering an incoming call based on thermally detecting proximity to a user of a mobile device. Changes in detected temperatures may be tracked to identify events such as the user removing the device from a stowed position, such as a pocket or a handbag, and placing the device proximate their ear. Upon detecting the proximity to the user, the call may be answered without requiring any other interaction between the user and the device.

FIG. 1 is a simplified block diagram of a device 100 configured to answer an incoming call based on thermally detecting the proximity of the device 100 to a user, according to some embodiments. The device 100 implements a computing system 105 including, among other things, a processor 110, a memory 115, a microphone 120, a speaker 125, a display 130, a thermal sensor 135, and an orientation sensor 138 (e.g., an accelerometer, magnetometer, mercury switch, gyroscope, compass, or some combination thereof) for measuring the position and/or movement of the device 100 relative to a physical reference point or surface. The memory 115 may be a volatile memory (e.g., DRAM, SRAM) or a non-volatile memory (e.g., ROM, flash memory, hard disk, etc.). The device 100 includes a transceiver 140 for transmitting and receiving signals via an antenna 145. The transceiver 140 may include one or more radios for communicating according to different radio access technologies, such as cellular, Wi-Fi, Bluetooth®, etc. In various embodiments, the device 100 may be embodied in mobile devices, such as mobile telephones, personal data assistants, music players, game devices, and the like that are capable of receiving incoming calls.

In the device 100, the processor 110 may execute instructions stored in the memory 115 and store information in the memory 115, such as the results of the executed instructions. Some embodiments of the processor 110 and the memory 115 may be configured to implement a software application referred to as a call manager 150. The call manager application 150 employs external temperature data from the thermal sensor 135 to infer actions of the user responsive to receiving an incoming call and to thermally detect a proximity to the user. In the depicted example, the thermal sensor 135 generates values of an external temperature associated with the device 100, such that it does not measure the internal or skin temperature of the device 100 itself, but rather it measures an external temperature of the ambient environment close to the device 100. The thermal sensor 135 may be positioned on the side of the device 100 that includes the display 130, such that it can detect the proximity of the user to the device 100 based on the measured external temperature. In some embodiments, the thermal sensor 135 may be positioned near to or integrated with the speaker 125, as the user is likely to place their ear near the speaker 125 if they intend to answer an incoming call.

The processor 110, by executing the call manager 150, performs a method 200 shown in FIG. 2 and discussed below. For example, the processor 110 may execute instructions to provide functionality in the call manager 150 to handle incoming calls according to the method 200.

FIG. 2 is a flow diagram of an illustrative method 200 for answering an incoming call based on thermally detecting the proximity to a user to the device 100, according to some embodiments. In general, the device 100 is capable of implementing various elements of the method 200 shown in FIG. 2.

In method block 205, an incoming call is received in the device 100.

In method block 210, a call alert notification is generated to notify the user of the incoming call. The call alert notification may include an audio alert (e.g., ring tone, etc.), a vibration alert, or the like. The call manger 150 may also provide an incoming call user interface (not shown) on the display 130 coincident with the call alert notification. The incoming call user interface may allow the user to interact with the display 130 to answer the call, ignore the call, reply with a text etc. In some instances, it may not be convenient for the user to interact with the display 130 to address the call. For example, during cold weather, the user may be wearing gloves that interfere with touch sensors (not shown) in the display 130. In another example, the user may be carrying something and only able to use one hand. Interacting with the incoming call user interface with one hand is sometimes difficult and increases the likelihood that the device 100 may be dropped.

To facilitate automatically answering the call, the call manager 150 infers actions of the user regarding their intended handling of the call. In general, if the user is in a situation where it would be difficult to interact with the incoming call user interface on the display 130, it is unlikely that the user would be holding the device 100. For example, the device 100 might be located in the user's pocket, handbag, backpack, etc., which may be referred to a stowed position. In a typical situation, upon recognizing the call alert notification, the user is likely to take the device 100 in their hand to see who is calling and allowing them to decide whether to answer or ignore the call (i.e., answer the call or let the call go to voice mail). Rather than requiring the user to interact with the display 130, the call manager 150 may selectively answer the incoming call or send it to voice mail based upon thermally detecting the presence of the user relative to the device 100. For example, the user may place the device 100 proximate their ear, indicating a desire to answer the call, or return the device 100 to the stowed position, indicating a desire to ignore the call. In some embodiments, the call manager 150 employs external temperature measurements from the thermal sensor 135 and, in some embodiments, the orientation sensor 138, to infer one or more of these actions.

FIG. 3 is a diagram illustrating one example of an external temperature profile 300 associated with the user's interaction with the device 100 to address an incoming call, according to some embodiments. In general, the call manager 150 may selectively answer or ignore the incoming call based on the external temperature profile that reflects the user's proximity to the device 100.

For purposes of the following illustration, it is assumed that the device 100 is initially placed in a stowed position by the user, as represented by region 305 of the external temperature profile 300. In the stowed position, the temperature of the device 100 is relatively stable due to it being somewhat insulated from the external environment. For example, if the device 100 is in the user's pocket, some of the user's body heat may increase the temperature of the stowed position relative to the external environment, assuming the ambient temperature is less than the user's body temperature. Even without body heat, it is likely that the temperature in stowed position may be greater than the ambient temperature due to the insulating effect of the stowed position.

In method block 215 (FIG. 2), a removal of the device 100 from the stowed position is detected. In one embodiment, this removal may be detected based on a decrease in the external temperature measured by the thermal sensor 135 of the device 100, as represented by the time period region 310 of FIG. 3. The magnitude of the decrease is dependent on the ambient temperature and the temperature of the device 100 before it is removed from the stowed position. On a cold day, the increase would be expected to be greater than it would be on a relatively warmer day. A threshold value (e.g., at least 15° F.) may be used for detecting a decrease in temperature that warrants a response from the system. The threshold value may be relative to the external temperature of the environment measured during region 305 when the call was received. If, based upon the sensed temperature, no removal of the device 100 from the stowed position is detected in method block 215, the call is ignored in method block 220. The orientation sensor 138 may also indicate motion of the device 100 indicative of the removal from the stowed position. The call manager 150 may monitor for the removal of the device 100 from the stowed position during the duration of the call alert notification, i.e., until the device 100 stops ringing.

In method block 225 (FIG. 2), the call manager 150 determines if the thermal sensor 135 detects the proximity of the device 100 to the user. In one embodiment, this proximity may be detected based on an increase in the external temperature measured by the thermal sensor 135, as represented the solid curve in region 315 of FIG. 3. In one embodiment, the measured external temperature should be close to the user's skin temperature, which may have some variability due to several factors, such as the ambient temperature of the overall environment, the presence of hair or clothing between the device 100 and the user, etc. In some embodiments, the thermal sensor 135 may be co-located with an earpiece of the device 100 that supports the speaker 125. Accordingly, the thermal sensor 135 may detect an inner ear temperature of the user when the device 100 placed proximate the user's ear. Of course, the presence of hair or clothing may reduce the detected temperature, which may be accounted for using appropriate thresholds.

In some embodiments, a fixed threshold value may be used for detecting proximity to the user that warrants a response by the system, such as a temperature greater than about 80° F.-90° F. (e.g., 85° F.). In other embodiments, the threshold temperature may be set relative to the external temperature measured during the time period region 310 when the device 100 was removed from the stowed position. The orientation sensor 138 may indicate that the device 100 is being held in a substantially vertical position consistent with being positioned near the user's ear.

If user proximity to the device 100 is detected in method block 225 based upon the rules established by the system, the call is answered in method block 230. If user proximity to the device 100 is not thermally detected in method block 225, the call manager 150 attempts to detect if the device is returned to the stowed position in method block 235. In one embodiment, a return to the stowed position may be detected based on the external temperature measured by the thermal sensor 135 returning to a value within a predetermined range of the temperature measured in region 305, as represented the dashed curve in region 315 of FIG. 3. The orientation sensor 138 may also indicate return to the stowed position. The call manager 150 may cycle between the detections of method blocks 225 and 235 during the duration of the call alert notification, after which, the call is ignored in method block 220. If the call manager 150 detects the return to the stowed position in method block 235, the call alert notification is terminated (i.e., early) in method block 240, and the call is ignored in method block 220.

The acts of selective answering or ignoring an incoming call using the techniques described herein does not require the user to interface with the display 130 or some other button on the device 100 to answer the call. The user simply has to place the device 100 near their ear after retrieving the device 100 from the stowed position. The magnitudes of the various temperature thresholds for inferring the events may be selected to avoid false detections. On a hot day, the external temperature profile may not be useful for detecting the user's actions, so the call would not be automatically answered.

In some embodiments, certain aspects of the techniques described above may implemented by one or more processors of a processing system executing software. The method 200 described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes generating a call alert notification on a device responsive to receiving an incoming call. A removal of the device from a stowed position is detected after generating the call alert notification. The incoming call is answered responsive to thermally detecting a proximity between the device and the user within a predetermined time period after detecting the removal of the device from the stowed position.

A method includes generating a call alert notification on a device responsive to receiving an incoming call. An external temperature associated with the device is monitored after generating the call alert notification. A reduction in the external temperature is detected after generating the call alert notification. The incoming call is answered responsive to determining that the external temperature is above a threshold within a predetermined time period after detecting the reduction.

A device includes a transceiver to detect an incoming call, a speaker, a thermal sensor positioned proximate the speaker to detect an external temperature associated with the device, and a processor coupled to the thermal sensor. The processor is to generate a call alert notification on the device responsive to receiving a notification of the incoming call from the transceiver, detect a removal of the device from a stowed position after generating the call alert notification based on the external temperature, and answer the incoming call responsive to thermally detecting a proximity between the device and the user based on the external temperature measured by the thermal sensor within a predetermined time period after detecting the removal of the device from the stowed position.

A method includes generating a call alert notification on a device responsive to receiving an incoming call. An external temperature profile associated with the device is monitored after generating the call alert notification. The incoming call is selectively answered or ignored based on the external temperature profile.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method comprising:
  generating a call alert notification on a device responsive to receiving an incoming call;
  detecting a removal of the device from a stowed position after generating the call alert notification; and
  answering the incoming call responsive to thermally detecting a proximity between the device and the user within a predetermined time period after detecting the removal of the device from the stowed position, wherein thermally detecting the proximity between the device and the user comprises detecting the proximity based on values of an external temperature associated with the device generated by a thermal sensor positioned proximate a speaker of the device and detecting that the external temperature associated with the device is above a threshold, the threshold being generated relative to a value of the external temperature detected by the thermal sensor after detecting the removal of the device from the stowed position.

2. The method of claim 1, wherein detecting the removal of the device from the stowed position comprises detecting a reduction in the external temperature.

3. The method of claim 2, wherein thermally detecting the proximity between the device and the user comprises detecting an increase in the external temperature having a magnitude greater than the detected reduction.

4. The method of claim 1, further comprising disconnecting the incoming call responsive to detecting a return of the device to the stowed position prior to thermally detecting the proximity between the device and the user.

5. The method of claim 4, wherein detecting the return of the device to the stowed position comprises:
  monitoring an external temperature associated with the device using a thermal sensor in the device;
  detecting a first value of the external temperature when the call alert notification is generated;

detecting a decrease in the external temperature indicative of the removal of the device from the stowed position; and detecting return of the external temperature to a second value within a predetermined range of the first value after detecting the decrease.

6. The method of claim 1, wherein detecting the removal of the device from the stowed position comprises detecting motion of the device using an orientation sensor.

7. The method of claim 1, wherein the predetermined time period corresponds to a duration of the call alert notification.

8. A device, comprising:
a transceiver to detect an incoming call;
a speaker;
a thermal sensor positioned proximate the speaker to detect an external temperature associated with the device; and
a processor coupled to the thermal sensor, wherein the processor is to generate a call alert notification on the device responsive to receiving a notification of the incoming call from the transceiver, detect a removal of the device from a stowed position after generating the call alert notification based on the external temperature, and answer the incoming call responsive to thermally detecting a proximity between the device and the user based on the external temperature measured by the thermal sensor within a predetermined time period after detecting the removal of the device from the stowed position, wherein the processor is to thermally detect the proximity between the device and the user by detecting that the external temperature associated with the device is above a threshold and generate the threshold relative to a value of the external temperature detected by the thermal sensor after the processor detects the removal of the device from the stowed position.

9. The device of claim 8, wherein the processor is to detect the removal of the device from the stowed position by detecting a reduction in the external temperature.

10. The device of claim 9, wherein the processor is to thermally detect the proximity between the device and the user by detecting an increase in the external temperature having a magnitude greater than the detected reduction.

11. The device of claim 8, wherein the processor is to disconnect the incoming call responsive to detecting a return of the device to the stowed position based on the external temperature prior to thermally detecting the proximity between the device and the user.

12. The device of claim 11, wherein the processor is to detect the return of the device to the stowed position by detecting a first value of the external temperature when the call alert notification is generated, detecting a decrease in the external temperature indicative of the removal of the device from the stowed position, and detecting a return of the external temperature to a second value within a predetermined range of the first value after detecting the decrease.

13. The device of claim 8, further comprising an orientation sensor to detect motion of the device, wherein the processor is to detect the removal of the device from the stowed position based on the detected motion of the device.

14. The device of claim 8, wherein the predetermined time period corresponds to a duration of the call alert notification.

15. A method comprising:
generating a call alert notification on a device responsive to receiving an incoming call;

detecting a removal of the device from a stowed position after generating the call alert notification;
answering the incoming call responsive to thermally detecting a proximity between the device and the user within a predetermined time period after detecting the removal of the device from the stowed position;
disconnecting the incoming call responsive to detecting a return of the device to the stowed position prior to thermally detecting the proximity between the device and the user, wherein detecting the return of the device to the stowed position comprises:
monitoring an external temperature associated with the device using a thermal sensor in the device;
detecting a first value of the external temperature when the call alert notification is generated;
detecting a decrease in the external temperature indicative of the removal of the device from the stowed position; and
detecting return of the external temperature to a second value within a predetermined range of the first value after detecting the decrease.

16. The method of claim 15, wherein detecting the removal of the device from the stowed position comprises detecting motion of the device using an orientation sensor.

17. The method of claim 15, wherein the predetermined time period corresponds to a duration of the call alert notification.

18. A device, comprising:
a transceiver to detect an incoming call;
a speaker;
a thermal sensor positioned proximate the speaker to detect an external temperature associated with the device; and
a processor coupled to the thermal sensor, wherein the processor is to generate a call alert notification on the device responsive to receiving a notification of the incoming call from the transceiver, detect a removal of the device from a stowed position after generating the call alert notification based on the external temperature, answer the incoming call responsive to thermally detecting a proximity between the device and the user based on the external temperature measured by the thermal sensor within a predetermined time period after detecting the removal of the device from the stowed position, and disconnect the incoming call responsive to detecting a return of the device to the stowed position based on the external temperature prior to thermally detecting the proximity between the device and the user, wherein the processor is to detect the return of the device to the stowed position by detecting a first value of the external temperature when the call alert notification is generated, detecting a decrease in the external temperature indicative of the removal of the device from the stowed position, and detecting a return of the external temperature to a second value within a predetermined range of the first value after detecting the decrease.

19. The device of claim 18, further comprising an orientation sensor to detect motion of the device, wherein the processor is to detect the removal of the device from the stowed position based on the detected motion of the device.

20. The device of claim 18, wherein the predetermined time period corresponds to a duration of the call alert notification.

* * * * *